US007668180B2

(12) United States Patent
Ben-David (10) Patent No.: US 7,668,180 B2
(45) Date of Patent: Feb. 23, 2010

(54) DISTRIBUTED MULTIMEDIA AND MESSAGING ROUTER OVER LAYER 2

(76) Inventor: Shimon Ben-David, 10 Hacarcom St., Binyamina (IL) 30500

( * ) Notice: Subject to any disclaimer, the term of this patent is extended or adjusted under 35 U.S.C. 154(b) by 789 days.

(21) Appl. No.: 11/363,623

(22) Filed: Feb. 28, 2006

(65) Prior Publication Data

US 2009/0028181 A1  Jan. 29, 2009

Related U.S. Application Data

(63) Continuation-in-part of application No. PCT/IL2004/000782, filed on Aug. 30, 2004.

(60) Provisional application No. 60/551,635, filed on Mar. 4, 2004, provisional application No. 60/533,744, filed on Dec. 28, 2003, provisional application No. 60/500,352, filed on Sep. 1, 2003.

(51) Int. Cl.
    *H04L 12/28* (2006.01)
(52) U.S. Cl. ..................................... 370/400
(58) Field of Classification Search ....................... None
    See application file for complete search history.

(56) References Cited

U.S. PATENT DOCUMENTS 6,154,465 A    11/2000  Pickett ....................... 370/466
6,526,581 B1 *  2/2003  Edson .......................... 725/74
6,747,996 B2 *  6/2004  Holloway et al. ........... 370/503
6,868,072 B1 *  3/2005  Lin et al. .................... 370/276
6,877,043 B2 *  4/2005  Mallory et al. .............. 709/251
2002/0176430 A1  11/2002  Sangha et al. ............... 370/412

* cited by examiner

*Primary Examiner*—Frank Duong
(74) *Attorney, Agent, or Firm*—Martin Fleit; Paul D. Bianco; Fleit Gibbons Gutman Bongini & Bianco PL (57) ABSTRACT

A system and a method are disclosed which utilizes the standard communication devices at the users' premises and a standard LAN communication in order to enable utilization of IP communication possibilities such as V/FoIP calls, SMS and MMS messaging and video communication over IP network. The system includes a single Local Server and multiple Endpoint Interface Units. The Local Server connects the LAN to the external IP communication and each Endpoint Interface Units connects the communication devices to the LAN. According to the preferred embodiment all communication between the Local Server and the Endpoint Interface Units is established using a layer 2 communication protocol which improves the data transport capabilities of any given network and lowers the overall costs of the system's implementation. In a second embodiment the data processing procedure is performed on an external server which establishes a VPN communication with each Local Server.

28 Claims, 5 Drawing Sheets

| 6 Byte | 6 Byte | 2 Byte | 1 Byte | 1 Byte | 1 Byte | 3 Byte | 2 Byte | 38-1024 Bytes | 4 Byte |
|---|---|---|---|---|---|---|---|---|---|
| Destination | Source | Length | DSAP | SSAP | cntl | Org Code | Type | Data | CRC |

DISTRIBUTED MULTIMEDIA AND MESSAGING ROUTER OVER LAYER 2

This application is a continuation in part, claiming priority from PCT application no. PCT/IL04/00782 filed on Aug. 30, 2004 having a priority date of Sep. 1, 2003.

BACKGROUND

The present invention relates to the field of coin communications. More particularly, the present invention relates to multimedia systems which enable voice, video and messages communication over data communications network in a user premises using standard customer premises equipment (CPE) and communication infrastructure.

The widening availability of higher bandwidth and low-latency performance capabilities of broad-band network connections over the last few years have expanded the communication possibilities available to users of a home computer in their premises. At the same time Local Area Networks (LANs) penetrate more and more user environments as means of sharing data between digital devices. All such LANs share a common scheme of operation known as Ethernet and standardized as a family of IEEE standards (802.x). Examples of such popular LANs are Wi-Fi, HomePNA, HomePlug, and Bluetooth.

The appeals of communication via the Internet or similar IP networks, compared to communication via the Public Switched Telephone Network (PSTN), are lower cost and extended communication possibilities. In order to take advantage of these possibilities, users and service providers alike seek to shift more and more communication traffic from the PSTN to the Internet or similar IP networks. Main enablers of this traffic are the video and voice over Internet protocols (VoIP) which allow making video and telephone conversations via any IP network connection bypassing the PSTN altogether. Among these industry-standard protocols are media compression and decompression standards (such as G.723.x, G.729.x) and media and signaling management protocols (such as SIP, H.323/H.324, MGCP, etc.)

There are several solutions for utilizing these services from the user premises, mainly involving direct usage of the PC, through a microphone and speakers, or by using dedicated IP-enabled telephone sets (IP phones). However, using the PC to conduct the main volume of telephone calls is far from convenient, and current overhead involved with implementing an IP phone makes it expensive and prevents it from becoming a common household appliance. A common characteristic of the existing solutions is the need to implement an IP network protocols stack and voice-over-IP protocol stack in the users' local unit: in case of PC-based solution, the PC is running the IP and voice-over-IP protocol stack; in case of an IP-enabled telephone, the telephone contains a CPU running the IP stack and voice-over-IP stack. This mandates that local units of existing solutions must possess considerable computing power to support these protocol stacks.

US Patent Application No. 20020176430 discloses methods and systems for managing data packets in various communication networks. The system includes a first memory for storing at least a free data pointer and a buffer descriptor. The free data pointer points to a data buffer allocated in a second memory. The buffer descriptor includes at least a data pointer pointing to a data buffer configured to store one or a portion of the communication packet. The first memory has a maximum threshold such that if the number of buffer descriptors stored in the first memory reaches the maximum threshold one or more buffer descriptors stored in the first memory are transferred to the second memory.

U.S. Pat. No. 6,154,465 discloses systems and methods by which voice/data communications may occur in multiple protocols. In particular, it describes systems and methods for multiple native protocol voice and data transmissions and receptions with a computing system having a multi-bus structure. In preferred embodiments, a time division multiplexing (TDM) bus and a packet bus are bridged and managed, thereby enabling such multiple protocol voice and data transmissions to be managed and controlled with a single, integrated system. A computer or other processor includes a local area network controller, which provides routing and hub(s) for one or more packet networks. The TDM bus is coupled to a various line/station cards, serving to interface the TDM bus with telephone, facsimiles and other telecommunication devices, and also with a various digital and/or analog WAN network services.

None of the above systems and methods enables connecting POTS communication devices, such as analog telephones and fax machines, to IP network services. Moreover, none of the existing systems and methods enable performing this using the existing household network infrastructure. There is therefore a need for a means for utilizing the existing communication network in the user's premises to enable conducting voice, text and video communications through the IP network.

SUMMARY

A system enabling multimedia and messaging communication over a Local Area Network (LAN) and an external Wide Area Network (WAN) is disclosed. A local server controls and manages the communication, which provides distribution of digitally represented voice, video, text and fax signals over said LAN utilizing layer 2 communication protocol. On the LAN are also Endpoint Interfaces Unit for each endpoint communication device. Each Endpoint Interfaces Unit, which has a unique MAC address, performs conversion between analog and digital signals and vice versa. The LAN communication network may be a wired network or a wireless network. The Local Server may interact with more then one LAN network simultaneously. Each Endpoint Interface Unit consists of a controller with a memory, a Codec, a LAN interface section and a media terminal device interface section. The Local Server consists of a Controller with a memory, a LAN interface section and a WAN interface section. The communication between the units on the LAN is done in Ethernet Layer 2 packets.

The Endpoint Interface Units and the Local Server are enabled to implement a Voice-over-IP protocol stack; signal processing may be performed by the Endpoint Interface Units as well as by the Local Server. The control signals exchanged between the system's units on the LAN is embedded within the digitally represented multimedia signals contained in the data payload of layer 2 packets.

The system of claim 1 wherein the Endpoint Interface Units are connected to endpoint communication devices for converting incoming communication signals to native signaling of said endpoint communication device. The Endpoint Interface Units periodically sample their endpoint communication devices the LAN interfaces.

The Endpoint Interface Unit receives incoming textual and/or MMS messages and displays them on the respective endpoint communication device and transmits outgoing textual and/or MMS messages, obtained from a endpoint communication device through the Endpoint Interface unit's Media Terminal Interface.

The Local Server transmits textual and/or MMS messages to a messaging server over the WAN and receives textual and/or MMS messages from a messaging server over the WAN. The Endpoint Interface Unit which performs MAC operations may be a software running on the internal controller, and the LAN interface section of an Endpoint Interface Unit consists of the following main functions: a Phy device, a buffer memory (FIFO) and a digital interface to the unit's controller. A FIFO buffer is used to synchronize the rates of the Phy device and the multimedia stream, in both directions.

The Local Server periodically aggregates digitally represented multimedia samples originating from several Endpoint Interface Units into packets forwarded over the WAN, and periodically de-aggregates incoming packets from the WAN into several layer 2 packets destined to different Endpoint Interface Units and forwards each said layer 2 packet to its destination Endpoint Interface over the LAN.

A method for distributing multimedia and messaging communication over a Local Area Network (LAN) and an external Wide Area Network (WAN) is also disclosed. The communication, which is controlled and managed by a local gateway server, distributes digitally represented voice, video, text and fax signals over said LAN utilizing layer 2 packets transport between Endpoint Interface Units of each endpoint communication device having unique MAC address and the local server. The Endpoint Interface Units are enabling conversion between analog and digital signals.

Said method comprises the steps of periodically receiving digitized video packets over the LAN network through the LAN interface by said Endpoint Interface Unit, converting the data to analog form using Codec, periodically transmitting the analog signals through the end device interface, periodically constructing layer 2 packets carrying said digital data and transmitting said layer 2 packets to the Local Server.

Said method also comprises the steps of periodically sampling the unit's WAN interface, constructing layer 2 packets form said sampled data, periodically forwarding said layer 2 packets to the unit's LAN interface for transmission over LAN network, periodically receiving layer 2 packets from the unit's LAN interface, separating the data from the layer 2 headers and constructing the data in new packets in a WAN compliant format, and periodically forwarding said formatted packets to their destinations over the WAN through the unit's WAN interface.

The method also includes the following steps: periodically sampling the local server LAN interface and collecting the digital data from the received layer 2 packets; aggregating the data from different layer 2 packets by die Local Server into larger packets in the appropriate WAN protocols, wherein said packets originate from different Endpoint Interface Units on the LAN; forwarding said packets through its WAN interface, over the WAN to the remote server; Periodically sampling the local server WAN interface of packets coming from the remote server; extracting the data payload from said sampled packets; re-constructing said extracted data into layer 2 packets addressed to the destination Endpoint Interface Units; periodically forwarding said layer 2 packets by the local server to their destination Endpoint Interface Units over the LAN through its LAN interface.

DESCRIPTION

The present invention is a new and innovative system and method for a bi-directional distribution of digitally represented multimedia (such as voice, fax, video and textual messaging) over any Ethernet-based local area network (LAN) at the user's premises.

Voice communication is established using traditional wired or wireless telephone sets or cellular telephone handsets. Video bi-directional communication may be established using a digital camera and a common household television set or other types of display terminal devices such as a PDA handset. The system may operate via all types of Ethernet LANs, wire-line or wireless.

Figure 1:
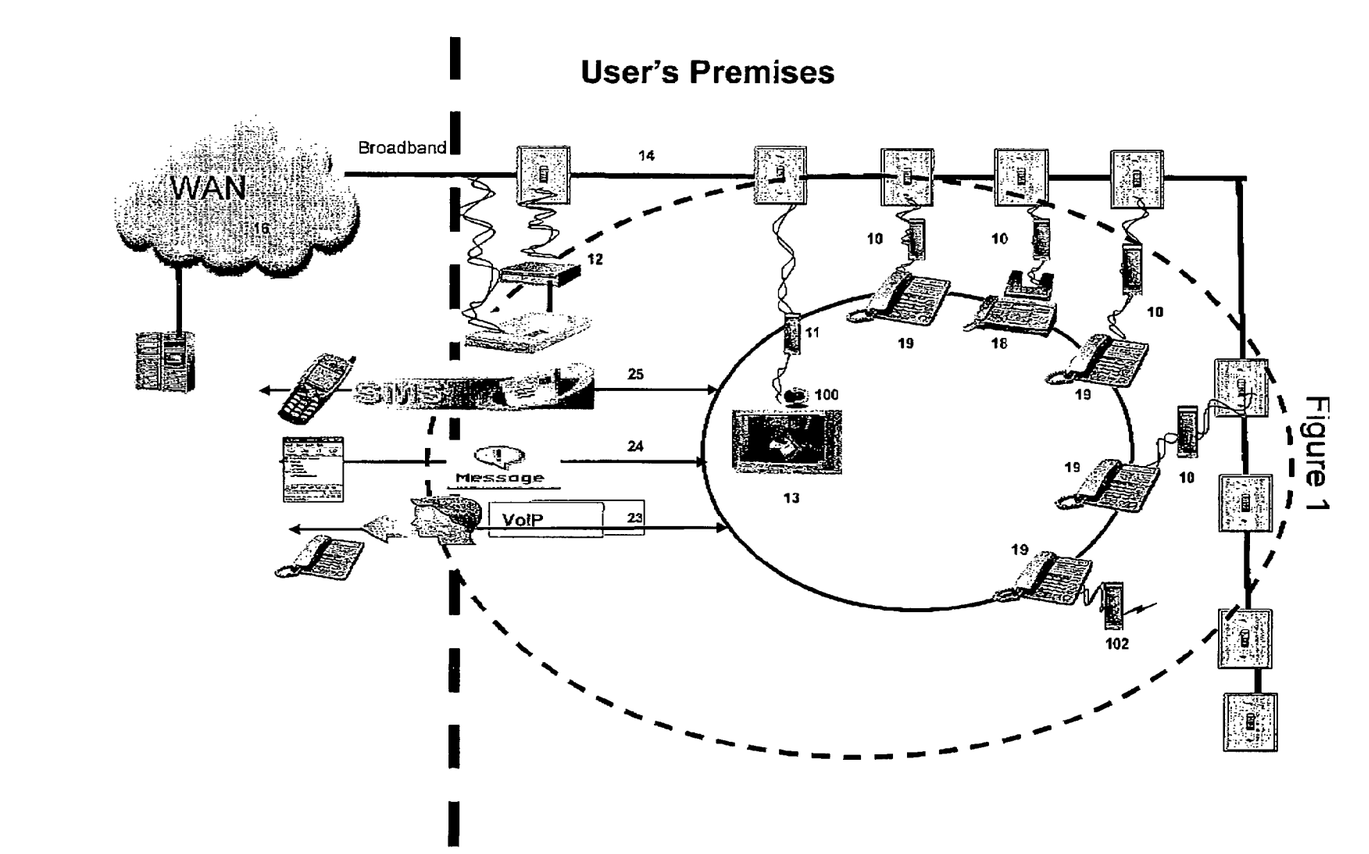
FIG. 1 is a schematic illustration of the first embodiment according to the present invention implemented via a wired local network.

FIG. 1 illustrates the functionality of the first embodiment according to the present invention. The system illustrated in FIG. 1 enables users to conduct a bi-directional communication using any of the endpoint communication devices 18, 19 connected to the LAN 14 through Endpoint Interface Units 10, 11. Voice communication 23, textual messages 25, instant messages or e-mails 24 can all be transported simultaneously over the LAN 14. The system also provides PBX services and allows users to conduct calls and transfer messages between Endpoint Interface Units 10, 11 over LAN 14. Any internal or external incoming call may be routed to a specific Endpoint Interface Unit 10, 11.

Figure 2:
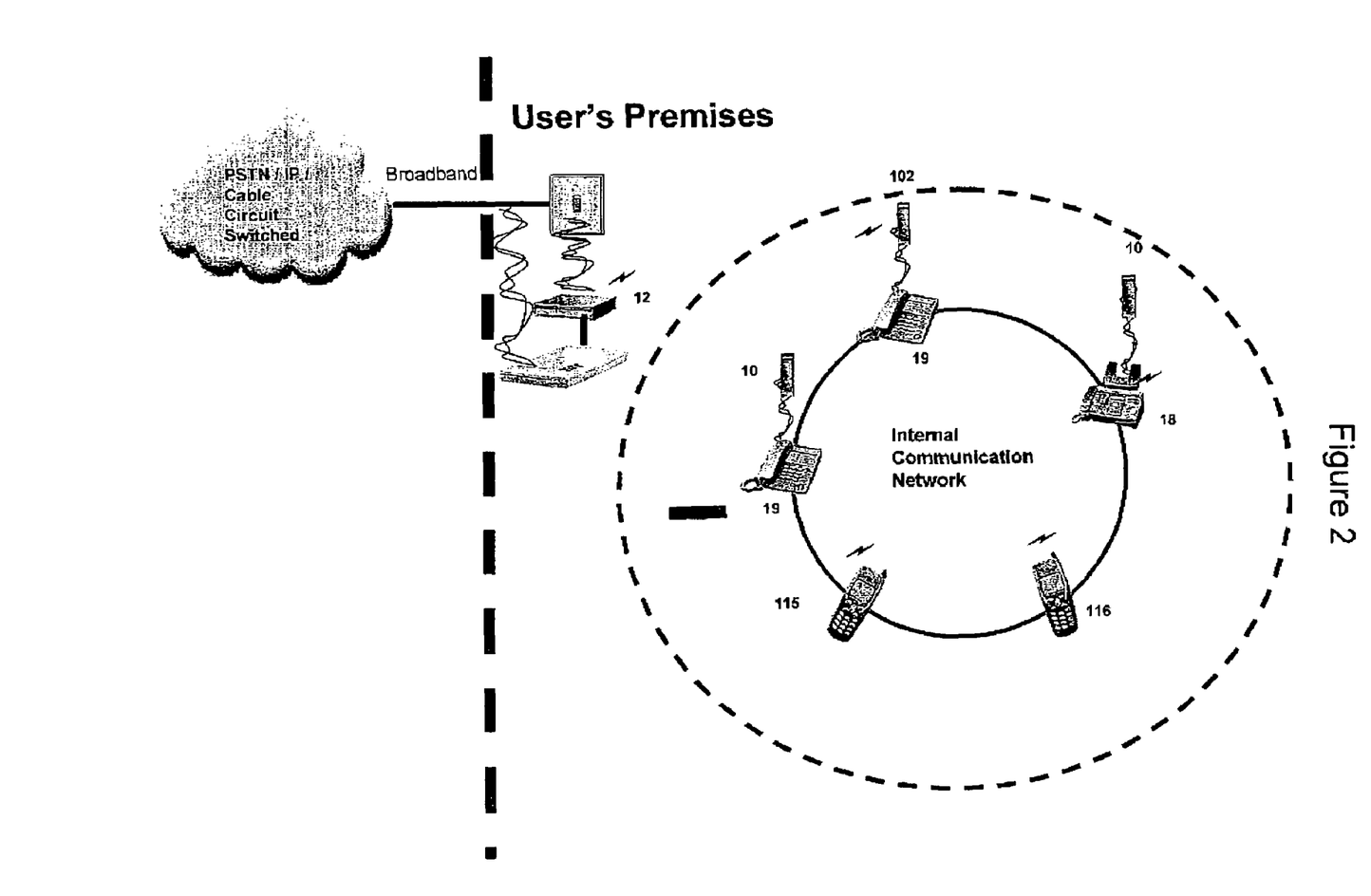
FIG. 2 is a schematic illustration of the first embodiment implemented via a wireless local network.

The LAN 14 may be any type of wired or wireless network (see FIG. 2). According to one implementation of the present invention the wired network is the twisted pair wiring system of the POTS already existing at user's premises, without any installation changes. Analog calls or digital data communication can be transferred over the same twisted pair wiring. The system does not interfere with the analog telephone operation and services, including advanced services such as call waiting and caller ID. The system also generates normal ring signal voltage in the case of an incoming digital phone call, and emulates the operation of the call waiting function for incoming digital phone calls. The system can work with any analog telephone set, corded or cordless and all system functions (voice transport, power transmission and control) are carried out while telephone line is kept in on hook state.

According to the first embodiment, the system consists of any number of End Point Units 10, 11, each connected to a terminal device, such as any type of regular household telephone set 19 (whether corded or cordless, analog or digital), fax machine 18 or TV screen 13 on one end, and to the LAN medium 14 on the other end. Endpoint Interface Units 10, 11 may be packaged as stand-alone devices or integrated into the endpoint communication devices 13, 18, 19, 100, 115, 116. Said Endpoint Interface Units 10, 11 communicate with the other units of the system over the LAN 14 (similarly to PBX extensions). In the system there is also a Local Server 12, connected to the LAN 14 medium on one end and to a Wide Area Network (WAN) 16 on the other end. The main function of the said Local Server 12 is establishing and maintaining the connection between the LAN 14 and the WAN 16 as well as handling the computing-intensive tasks of media streaming, such as echo cancellation and implementation of standard multimedia compression/decompression algorithms (e.g. G.723.x, G.729, etc.). The Local Server 12 carries out also media and signaling management tasks according to industry-standard protocols (SIP, MGCP, H.323, etc.).

Implementing the computing-intensive protocols on the Local Server 12 simplifies the structure and the functionality of Endpoint Interface Units 10, 11. Endpoint Interface Units 10, 11 connect to standard terminal devices, such as analog telephone sets or televisions, reflecting their native signaling. They may, for instance, generate PSTN-like ring signals and call progress tones for any of the telephone sets individually.

Endpoint Interface Unit 11 allows audio and video communication. It is connected to the LAN 14 on one end and to a display terminal 13 (such as a TV screen or a screen of a cellular or wireless handset) and local camera 100 (such as a web camera or a camera of a cellular or wireless handset) on the other end. Said Endpoint Interface Unit 11 may include integrated audio peripherals (microphone and speakers), or connect to external audio equipment. Alternatively, the audio for the video conference may be provided by any of the Endpoint Interface Units 10 in the system which are connected to a telephone terminal device or integrated into a wireless or cellular phone handset.

Figure 6:
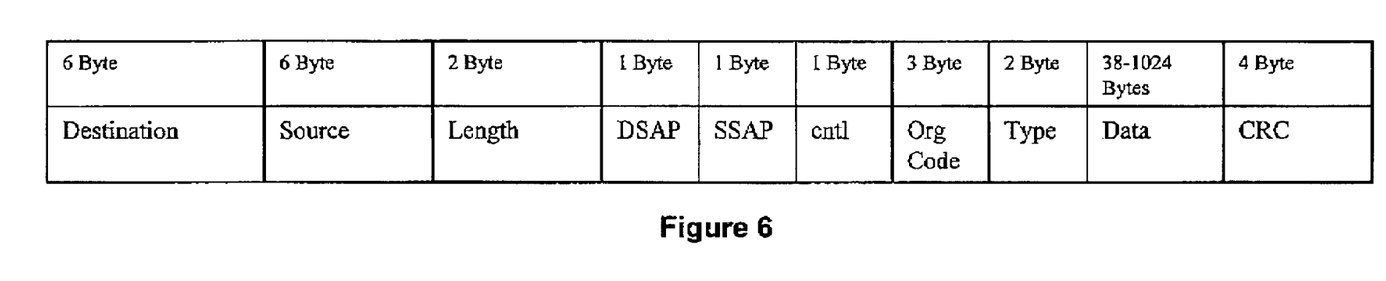
FIG. 6 illustrates the data structure of a packet in a layer 2 communication.

All of the system's units on the LAN 14 operate at Ethernet layer 2 protocol. Each unit has a Media Access Control (MAC) address which identifies it uniquely on the LAN 14. All units refer only to the MAC addresses when analyzing or constructing packets. Using the layer 2 protocol has several advantages, such as very low overhead: except for the layer 2 header fields, the full size of the Ethernet packet contains useful payload of digitally represented multimedia signals and textual messages. FIG. 6 illustrates the data structure of a packet on the layer 2. Since the Local Server 12 also acts as the LAN router, it manages the quality of service (QoS) aspects of streaming voice/video packets which improves the overall quality of streaming. The necessary control signaling exchanged between the system's units on the LAN is embedded within the digitally represented multimedia signals and textual messages contained in the data payload of the layer 2 packets.

Another advantage of the layer 2 communications is the ability of any two Endpoint Interface units to communicate directly with each other without utilizing the Local Server 12.

Figure 4:
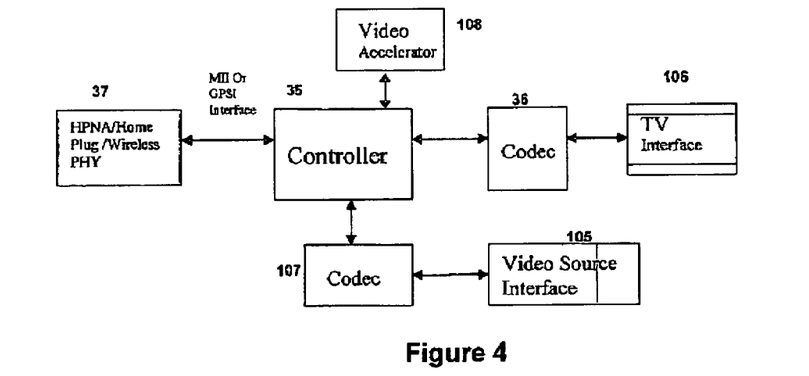
FIG. 4 is a block diagram of the logical structure of the first type of Endpoint Interface Units.

Following is a description of the system's operation. According to the first embodiment illustrated in FIG. 1, the system is comprised of three types of units: Endpoint Interface 10, 11 and Local Server 12. The logical structure of the first type of Endpoint Interface Units, the audio/textual units 10 is illustrated in FIG. 4. Every unit 10 consists of a controller 35 with a memory, a Codec 36, a LAN interface section 37 and a media terminal device interface section 38. One option for a media terminal device interface, illustrated in FIG. 1, is a telephone set interface 38. It provides the interface to a standard analog telephone set, fax machine or any PSTN-compatible device. The LAN 14 illustrated in FIG. 1 may be wired or wireless. As illustrated in FIG. 4 the Endpoint Interface unit 10 may be connected to or integrated with a Telephone set 18, FAX 19, cellular 115 or wireless handset 116.

Endpoint Interface Unit 10 receives through LAN interface 37 digitized voice packets, forwarded over LAN 14 by Local Server 12. It performs any necessary operations on the data contained in said packets, converts it to analog form using Codec 36 and transmits it in analog form to the attached endpoint communication device 11, 18, 19 through the media terminal interface 38. Incoming voice messages and audio messages may be received by Endpoint Interface unit 10, 11 through the LAN interface 37, then converted into analog voice signals using Codec 36 and transmitted through the media terminal interface 38 to the telephone set or to any other endpoint communication device 11, 18, 19 of that sort.

At Endpoint Interface Units 10, 11, the analog signals the media terminal interface 38 is periodically sampled and digitized using Codec 36 Endpoint Interface unit controller 35 periodically constructs layer 2 packets carrying said digitized data and periodically forwards them to Local Server 12 through LAN interface 37 and over LAN 14. Said controller 35 also periodically receives layer 2 packets from the LAN interface 37 of Units 10, 11 and extracts the data in them. Said data is periodically converted into analog form using Codec 36 and transmitted through the unit's media interface 38.

Endpoint Interface Units 10, 11 may also receive incoming short messages service (SMS) messages, Multimedia SMS (MMS) messages and/or instant messages, coming from a messaging server 103 on the WAN 16 to the Local Server 12 and from it over LAN 14 to LAN interface 37 of Endpoint Interface Units 10, 11, and display it on a built-in display 120 or on a endpoint communication device 11, 18, 19 attached to media terminal interface 38. Endpoint Interface Unit 10, 11 may also receive text messages firm the endpoint communication device 11, 18, 19 through media terminal interface 38 (such as textual messaged typed on the attached telephone's keypad), construct them into layer 2 packets and forward them through the LAN interface 37 and over LAN 14 to Local Server 12. Local Server 12 constructs said text messages into packets in a format suitable for WAN 16 and forwards them to an appropriate messaging server 103 on WAN 16 for further processing.

Figure 5:
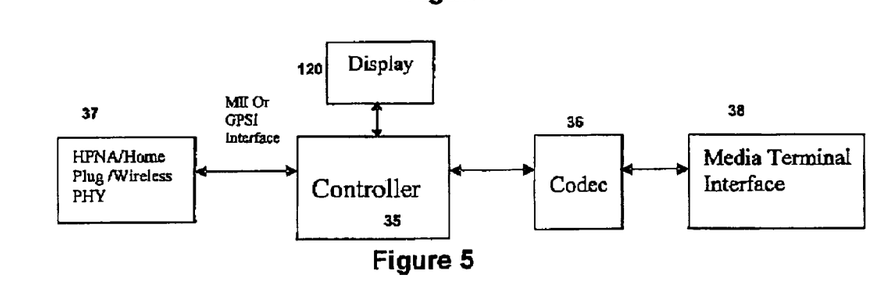
FIG. 5 is a block diagram of the logical structure of the second type of Endpoint Interface Units.

The second type of an Endpoint Interface Unit 11, which is illustrated in FIG. 5, consists of a controller 35 with a memory, a Codec 36, a Video accelerator, a LAN interface section 37, a Video source interface section 105 and a TV endpoint communication device interface section 106. The TV interface section 106 may connect to a standard TV receiver 13 or to any other visual endpoint communication device such as a projector or a computer monitor. Said Endpoint Interface Unit 11 periodically receives digitized video packets over the LAN 14 through the LAN interface 37, performs any necessary operations on the data using the video accelerator 108, converts the data to analog form using Codec 36 and periodically transmits the analog signals through the TV terminal interface 106 to the attached television set 13. It also periodically receives a video signal through the video source interface 105 (such as from a local camera 100), digitizes it, if necessary, using Codec 107, performs any necessary operations on the data using the Video accelerator 108, periodically constructs layer 2 packets carrying the said digital data and transmits said layer 2 packets to the Local Server 12. As mentioned above, all communication between Endpoint Interface Units 10, 11 and the Local Server 12 are performed through the LAN interface section 37 over the LAN 14. This type of Endpoint Interface Unit 11 may also receive incoming textual messages, contained in layer 2 packets, through the LAN Interface section 37 perform any processing required using the video accelerator 108 and Codec 36 and transmit it through the TV terminal interface 106 to the display on the terminal screen (such as a TV set).

Local Server 12 establishes and maintains the connection between the LAN 14 and the WAN 16 and handles the intensive computing tasks of media streaming, such as echo canceling and standard multimedia compression/decompression algorithms. Local Server 12 also carries out media and signaling management tasks according to industry-standard protocols (SIP, MGCP, H.323, etc.)

Said Local Server 12 also receives instant messages, SMS messages, MMS messages, and audio messages through WAN 16 and distributes them to Endpoint Interface Units 10, 11 over LAN 14 and vice-versa. Said Local Server 12 may support simultaneous connections to multiple Endpoint Interfaces 10, 11. Said Local Server 12 may also simultaneously support more then one LAN interface.

Figure 3:
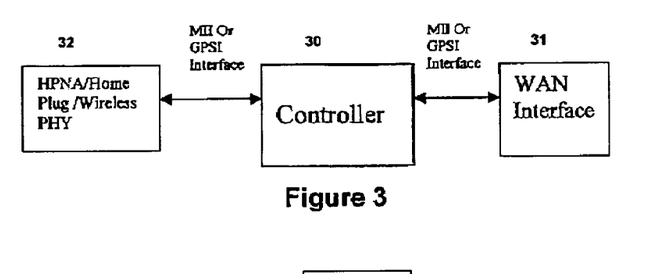
FIG. 3 is a block diagram of the logical structure of the Local Server according to the first embodiment.

As illustrated in FIG. 3 the Local Server consists of the following main building blocks: a Controller 30 with a memory, a LAN interface section 32 and a WAN interface section 31.

Controller 30 manages the operation of the entire unit and performs the MAC operations in software. Said controller 30 periodically samples the Unit's WAN interface 31 and constructs layer 2 packets from the sampled data, then periodically forwards the said layer 2 packets to the unit's LAN interface 32 for transmission over LAN 14. Said controller 30 also periodically receives layer 2 packets from the Unit's LAN interface 32, separates the data from the layer 2 headers and constructs the data in new packets, in a WAN compliant format, and then periodically forwards said formatted packets to their destinations over the WAN through the unit's WAN interface 31.

Following is a description of the LAN interfaces. Ethernet network interfaces are usually comprised of a physical layer interface component (Phy) implementing the physical layer of communication and the medium interface, and the MAC logic component managing the access to the network medium such as carrier sensing and collisions detection and prevention according to the Ethernet algorithms.

Figure 7:
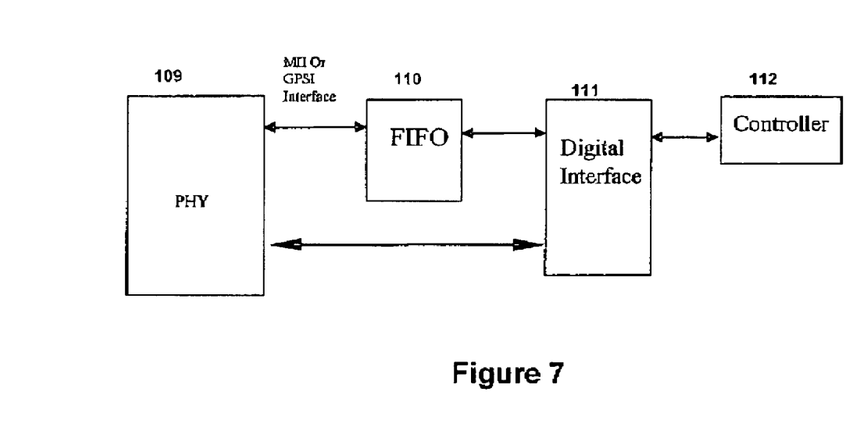
FIG. 7 is a block diagram of the LAN interface section in the Endpoint Interface Unit and of the synchronization FIFO between the controller data rates and the Phy device data rates.
Figure 8:
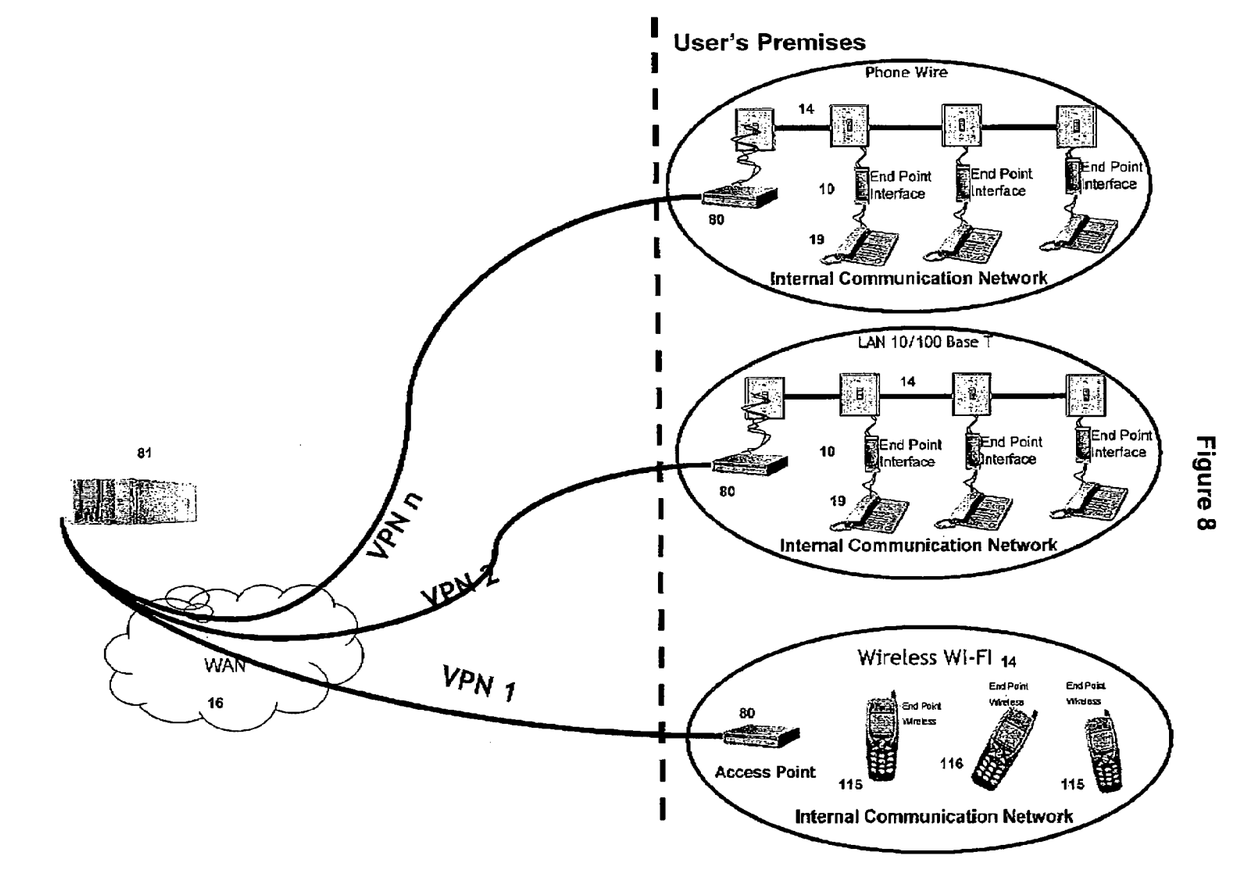
FIG. 8 Is a schematic illustration of the second embodiment according to the present invention.

Phy interface components are usually analog devices specific to one type of network medium. MAC controllers are usually implemented by digital hardware. The interface between Phy and MAC is a standard digital link, such as MII or GPSI. In the present invention, all MAC operations in the system's units 10, 11 and 12 are implemented at the software level, As illustrated in FIG. 7 The LAN interface section 32 37 of a unit consists of the following main functions: a Phy device 109, a buffer memory (FIFO) 110 and a digital interface 111 to the unit's controller 81. Said controller manages the operation of the entire unit and performs MAC operations in software. The said FIFO synchronizes between the different data rates of said controller 81 and the Phy device. Following is a description of the second embodiment. FIG. 8 illustrates the configuration of the second embodiment. According to the second embodiment the system utilizes the same Endpoint Interface Units 10, 11, 102 as in the first embodiment and has a Local Server 80 connected over the WAN 16 to a remote server 81 The connection between said Local Server 80 and remote server 81 may be a virtual private network (VPN). The Remote Server 81 may communicate with several Local Servers 80 simultaneously, Similarly to the first embodiment, all communication between the system's units over the LAN 14 is done in layer 2. The Local Server 80 establishes and maintains the connection between LAN 14 and WAN 16 Said Local Server 80 periodically samples its LAN interface and collects the digital data from the layer 2 packets it receives. The Local Server 80 then aggregates the data from different layer 2 packets, which may originate from different Endpoint Interface Units 10, 11, 102 on the LAN 14, into larger packets in the appropriate WAN protocols and forwards them, through its WAN interface, over the WAN 16 to the remote server 81 Said Local Server 80 also periodically samples its WAN interface for packets coming from the remote server 81, extracts the data payload from them and re-constructs it into layer 2 packets addressed to the destination Endpoint Interface Units 10, 11, 102. Local Server 80 periodically forwards said layer 2 packets to their destination Endpoint Interface Units 10, 11, 102 over the LAN 14 through its LAN interface.

In the second embodiment, remote server 81 handles the computing-intensive tasks of media streaming, such as echo canceling and standard multimedia compression and decompression algorithms (such as G.723.x, G.729, etc.), and also manages the sessions according to industry-standard protocols (SIP, H.323, MGCP, etc.).

As illustrated in FIG. 3 the Local Server 80 consists of the following main building blocks: a Controller 30, a LAN interface section 32 and a WAN interface section 31. The controller 30 manages the operation of the entire unit and performs MAC operations in the software level. Said controller 30 periodically samples the units' WAN interface 31 for incoming packets, extracts the data from them and constructs new layer 2 packets carrying the same data, then periodically forwards said layer 2 packets to the units' LAN interface 32 for transmission over the LAN 14. Said controller 30 also periodically receives layer 2 packets from the units' LAN interface 32, extracts the data carried in the layer 2 packets, constructs new packets carrying said data, in the appropriate format for the WAN 16, then periodically forwards the newly formatted packets to their destinations through the unit's WAN interface 31 and over the WAN 16. The Local Server 80 may support simultaneous connections to multiple Endpoint Interfaces 10, 11, 102.

The logical structure of the remote server 81 is illustrated in FIG. 7. Standard voice/video compression and encoding schemes are not necessarily used in the traffic between Local Server 80 and remote server 81. These computing-intensive operations may be performed by remote server 81. Remote server 81 performs the functions of an industry-standard IP telephony gateway. Remote server 81 resides on the network of the service provider, accessible to any Local Server 80 through a VPN connection and to the rest of the WAN 16 nodes.

What is claimed is:

1. A communication system which provides multimedia and messaging communication services to local End point devices, over a Local Area Network (LAN) and an external Wide Area Network (WAN), said system comprising:
    at least one Local Server, having at least one LAN interface and at least one WAN interface;
    at least one End point Interface unit, having a unique Media Access Control (MAC) address,
    wherein each of the End point Interface unit and the Local Server are arranged to communicate therebetween over a specified layer 2 communication protocol;

wherein the specified layer 2 communication protocol exhibits multimedia information combined with control signals associated with specified MAC addresses;

wherein the Local Server is arranged to attribute directly specific multimedia or control information to a specific End point device, by associating the specific multimedia or control information to the MAC address of the End point Interface unit associated with the specific End point device over the specified layer 2 communication protocol; and wherein the specified layer 2 communication protocol establishes bidirectional multimedia and control communication over the LAN network between the local server and the END point devices and between each two END point devices.

2. The system of claim 1 the system is arranged to convert between analog and digital signals.

3. The system of claim 1 wherein the LAN is a wired network, wherein the wired network is a single twisted pair wiring.

4. The system of claim 1 wherein the LAN is a wireless network.

5. The system of claim 1 wherein more than one LAN is connected to the Local Server at the same time.

6. The system of claim 1 wherein each Endpoint Interface Unit comprises a controller, a memory, a Codec, a LAN interface section and a media terminal device interface section.

7. The system of claim 1 wherein the Local Server comprises a Controller, a memory, a LAN interface section and a WAN interface section.

8. The system of claim 1 wherein the communication between the units on the LAN is done in Ethernet Layer 2 packets.

9. The system of claim 1 wherein the Endpoint Interface Unit implements a Voice-over-IP protocol stack.

10. The system of claim 1 wherein the Local Server unit implements a Voice-over-IP protocol stack.

11. The system of claim 1 wherein the signal processing is implemented centrally in the Local Server.

12. The system of claim 1 wherein the signal processing is implemented locally at each Endpoint Interface Unit.

13. The system of claim 1 wherein the control signals exchanged between the system's units on the LAN are embedded within the digitally represented multimedia signals contained in the data payload of layer 2 packets.

14. The system of claim 1 wherein at least one Endpoint Interface Unit is connected to an endpoint communication device for converting at least one of incoming communication signals to native signaling of endpoint communication device or outgoing communication signals from the native signaling of endpoint communication device.

15. The system of claim 1 wherein at least one Endpoint Interface Unit periodically sample its endpoint communication device.

16. The system of claim 1 wherein at least one Endpoint Interface Unit periodically samples al least one of its LAN interfaces.

17. The system according to claim 1 wherein the Endpoint Interface Unit receives at least one of incoming textual or Multimedia Messaging Service (MMS) messages and outputs them to the endpoint communication device.

18. The system according to claim 1 wherein the Endpoint Interface Unit forwards at least one of outgoing textual or Multimedia Messaging Service (MMS) messages, obtained from an attached device.

19. The system according to claim 1 wherein the Local Server transmits at least one of textual or Multimedia Messaging Service (MMS) messages to a messaging server over the WAN.

20. The system according to claim 1 wherein the Local Server receives at least one of textual or Multimedia Messaging Service (MMS) messages from a messaging server over the WAN.

21. The system according to claim 1 wherein the Endpoint Interface Unit implementing the Ethernet's MAC function in software rutting on the internal controller.

22. The system according to claim 5 wherein the LAN interface section of an endpoint unit consists of a Physical interface device, a First In First Out (FIFO) buffer memory and a digital interface to the unit's controller.

23. The system according to claim 21 wherein a First In First Out FIFO buffer memory is used to synchronize the rates of the Physical interface device and the multimedia stream, in at least one of the incoming or outgoing directions.

24. The system of claim 1 wherein a Local Server periodically aggregates digitally represented multimedia samples originating from several Endpoint Interface Units into packets forwarded over the WAN, and periodically de-aggregates incoming packets from the WAN into several layer 2 packets destined to different Endpoint Interface Units and forwards each said layer 2 packet to its destination Endpoint Interface over the LAN.

25. A method of providing multimedia and messaging communication services to local End point devices, over a Local Area Network (LAN) and an external Wide Area Network (WAN), said method comprising:

local network controlling and managing of layer 2 data packets received by a local server, said data includes multimedia and signaling information;

local endpoint controlling and managing of layer 2 data packets received by an End point Interface unit, said data includes multimedia and signaling information; and converting between analog and digital signals wherein said data packets are used for bi-directional communication over the, LAN network between the local server and the END point device, wherein the controlling and managing is performed over a specified layer 2 communication protocol that exhibits multimedia information combined with control signals associated with specified MAC addresses so that the specified protocol enables to attribute directly specific multimedia or control information to a specific End point device, by associating the specific multimedia or control information to the MAC address of the End point Interface unit associated with the specific End point device.

26. A method for of providing multimedia and messaging communication services to local End point devices, over a Local Area Network (LAN) and an external Wide Area Network (WAN), said method comprising:

local network controlling and managing of layer 2 data packets received by a local server, said data includes multimedia and signaling information;

local endpoint controlling and managing of layer 2 data packets received by an End point Interface unit, said data includes multimedia and signaling information; and converting between analog and digital signals wherein said data packets are used for bi-directional communication over the, LAN network between the local server and the END point device;

periodically receiving digitized video packets over the LAN through the LAN interface by said Endpoint Interface Unit;

periodically converting the data to analog form; periodically transmitting the analog signals to an attached device through an interface;

periodically constructing layer 2 packets carrying digital data; and periodically transmitting said layer 2 packets to the Local Server.

27. A method for of providing multimedia and messaging communication services to local End point devices, over a Local Area Network (LAN) and an external Wide Area Network (WAN), said method comprising:

local network controlling and managing of layer 2 data packets received by a local server, said data includes multimedia and signaling information;

local endpoint controlling and managing of layer 2 data packets received by an End point Interface unit, said data includes multimedia and signaling information; and converting between analog and digital signals wherein said data packets are used for bi-directional communication over the, LAN network between the local server and the END point device; periodically sampling the Local Servers WAN interface; and periodically constructing layer 2 packets from sampled data; and periodically forwarding said layer 2 packets to the LAN; and periodically receiving layer 2 packets from the LAN interface; and separating the data from the layer 2 headers and constructing the data in new packets in a WAN compliant format; and periodically forwarding formatted packets to their destinations over the WAN through a WAN interface.

28. A method for of providing multimedia and messaging communication services to local End point devices, over a Local Area Network (LAN) and an external Wide Area Network (WAN), said method comprising:

local network controlling and managing of layer 2 data packets received by a local server, said data includes multimedia and signaling information;

local endpoint controlling and managing of layer 2 data packets received by an End point Interface unit, said data includes multimedia and signaling information; and converting between analog and digital signals wherein said data packets are used for bi-directional communication over the, LAN network between the local server and the END point device;

periodically sampling the local server's LAN interface and collecting the digital data from the received layer 2 packets; and aggregating the data from different layer 2 packets into larger packets in the appropriate WAN protocols, wherein said packets originate from different Endpoint Interface Units on the LAN; and forwarding said packets through a WAN interface over the WAN to the remote server;

periodically sampling the local server WAN interface for packets coming from the remote server;

extracting the data payload from said sampled packets;

re-constructing said extracted data into layer 2 packets addressed to at least one destination Endpoint Interface Unit; and periodically forwarding said layer 2 packets to their destinations over the LAN.

* * * * *